F. F. Terry.
Sliding Gate.

Nº 59,873. Patented Nov. 20, 1866.

Witnesses.
F. A. Jackson.
Wm Trewin.

Inventor.
F. F. Terry
Per Munn & Co
Attys

United States Patent Office.

IMPROVEMENT IN FARM GATES.

FAYETTE F. TERRY, OF PORT GIBSON, NEW YORK.

Letters Patent No. 59,873, dated November 20, 1866.

SPECIFICATION.

TO ALL WHOM IT MAY CONCERN:

Be it known that I, FAYETTE F. TERRY, of Port Gibson, in the county of Putnam, and State of New York, have invented a new and improved Farm Gate; and I do hereby declare that the following is a full, clear, and exact description thereof, which will enable others skilled in the art to make and use the same, reference being had to the accompanying drawings forming part of this specification, in which—

Similar letters of reference indicate like parts.

Figure 1:
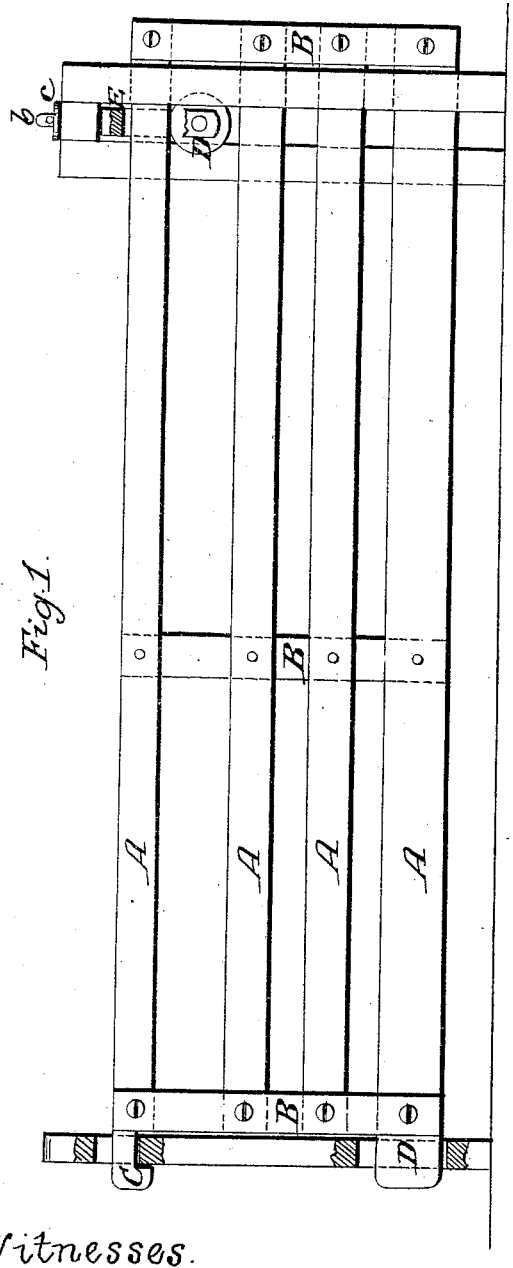
Figure 1 is a side elevation of a gate constructed and mounted according to my invention.
Figure 2:
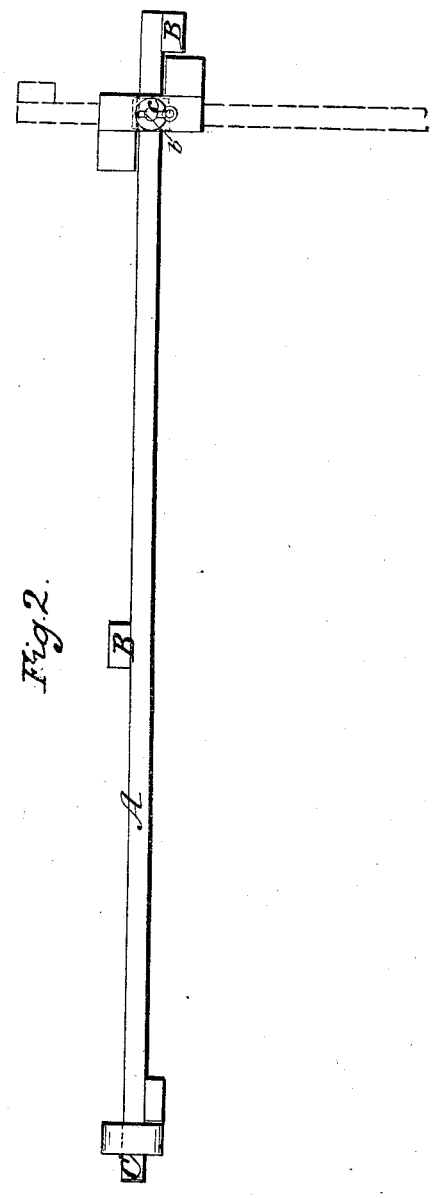
Figure 2 is a plan or top view of the same.

My invention relates particularly to the manner of hanging a gate arranged to slide upon a roller arranged between the rear posts, so that it can quickly be entirely removed from the fence in winter time, when snow might clog it, or at any time when it is not requisite to have the gateway closed. A A designates the several rails of the gate, and B B B the battens connecting them at each end and at their centres as usual. The top rail is extended out some distance beyond the front of the gate, and is cut in the shape of a hook, C, which projects through the fence post for preventing the gate casually sliding open as well as to support its forward end. An additional support for this end of the gate is effected by elongating the bottom rail as shown at D, and placing a rest for it in the post—a mortise, for instance, as shown for both extended portions in fig. 1. D is a roller or wheel of, say five inches diameter I prefer this to a smaller one, as I think the gate operates much easier. This roller is hung in a box, E, through which and above the roller the top rail of the gate slides. This box, E, has secured to its top a screw-rod $b$, which passes up through a top piece on the fence post, and the said box is secured in its proper position by a nut, $c$, screwing down upon the screw-rod, $b$, as shown clearly in the drawing.

From the foregoing description it will be seen that the height of the gate from the ground may be quickly increased or diminished by regulating the length of the screw-rod $b$, by the nut $c$; also that the gate may be quickly entirely removed from the fence by unscrewing the nut $c$, and withdrawing the screw-rod $b$ from the top piece of the post; and I will here remark that it is often desirable to remove farm gates during the winter season for many reasons.

I do not claim resting a gate upon a roller, for I am aware that it has been done long before, but I disclaim any of the parts the subject-matter of the patents granted to Wm. Snyder, March 6, 1866, and Wm. G. Hermann, February 20, 1866, but what I do claim, and desire to secure by Letters Patent, is—

Suspending the gate by means of the screw-rod $b$ and nut $c$, substantially as and for the purpose specified.

FAYETTE F. TERRY.

Witnesses:
   WM. F. McNAMARA,
   M. M. LIVINGSTON.